(12) United States Patent
Grasso

(10) Patent No.: US 8,255,933 B2
(45) Date of Patent: Aug. 28, 2012

(54) METHOD AND SYSTEM FOR READING DATA, RELATED NETWORK AND COMPUTER PROGRAM PRODUCT THEREFOR

(75) Inventor: Ennio Grasso, Turin (IT)

(73) Assignee: Telecom Italia S.p.A., Milan (IT)

( * ) Notice: Subject to any disclaimer, the term of this patent is extended or adjusted under 35 U.S.C. 154(b) by 1410 days.

(21) Appl. No.: 11/659,852

(22) PCT Filed: Aug. 12, 2004

(86) PCT No.: PCT/EP2004/009031
§ 371 (c)(1),
(2), (4) Date: Feb. 9, 2007

(87) PCT Pub. No.: WO2006/015611
PCT Pub. Date: Feb. 16, 2006

(65) Prior Publication Data
US 2007/0199001 A1    Aug. 23, 2007

(51) Int. Cl.
G06F 3/00    (2006.01)
G06F 9/44    (2006.01)
G06F 9/46    (2006.01)
G06F 13/00   (2006.01)
(52) U.S. Cl. ........................................ 719/330; 709/220
(58) Field of Classification Search .................. 719/330; 709/227, 220
See application file for complete search history.

(56) References Cited

U.S. PATENT DOCUMENTS

| 6,175,879 B1 * | 1/2001 | Shah et al. ..................... 719/330 |
| 6,754,701 B1 | 6/2004 | Kessner |
| 7,054,925 B2 * | 5/2006 | Bauman et al. ............... 709/220 |
| 2001/0018701 A1 | 8/2001 | LiVecchi |
| 2002/0156897 A1 * | 10/2002 | Chintalapati et al. ......... 709/227 |
| 2003/0097488 A1 | 5/2003 | Bauman et al. |

OTHER PUBLICATIONS

Schmidt; "Reactor—An Object Behavioral Pattern for Demultiplexing and Dispatching Handles for Synchronous Events", retrieved from Internet: url>http://web.archive.org/web/20001215224700/http://www.cs.wustl.edu/{schmidt/pdf/reactor-siemens.pdf>, pp. 1-11, Nov. 29, 2000, (retrieved on Feb. 15, 2005).
Schmidt; "Resume for Douglas C. Schmidt" retrieved from Internet: url>http//web.archive.org/web/20001215224700/http://www.cs.wustl.edu/{schmidt/resume.html>, pp. 5-36, (retrieved on Feb. 15, 2005).
Schmidt et al.; "Comparing Alternative Programming Techniques for Multi-Threaded Corba Servers: The Thread-Pool Concurrency Model", SIGS C Plus Plus Report, Online! vol. 8, No. 2, Feb. 1996, retrieved from the Internet: URL :http://www.cs.wustl.edu/{schmidt/PFD/C++-report-co16.pdf>, pp. 1-12, (retrieved on Feb. 15, 2005); XP-002318836.

* cited by examiner

*Primary Examiner* — Diem Cao
(74) *Attorney, Agent, or Firm* — Finnegan, Henderson, Farabow, Garrett & Dunner, L.L.P.

(57) ABSTRACT

A system for receiving data, such as data from streaming protocols arranged in client requests, includes a plurality of worker threads for receiving the data; a master thread configured for assigning a given worker thread to handling an incoming client request; a parser module configured for parsing the data of the incoming client request received via the assigned thread, and identifying when a complete client request has been received. The master thread is configured for releasing the given worker thread from assignment to handling the incoming client request when the parser module indicates that the complete incoming client request has been received.

18 Claims, 6 Drawing Sheets

Fig_1

Prior Art

Fig_2

Prior Art

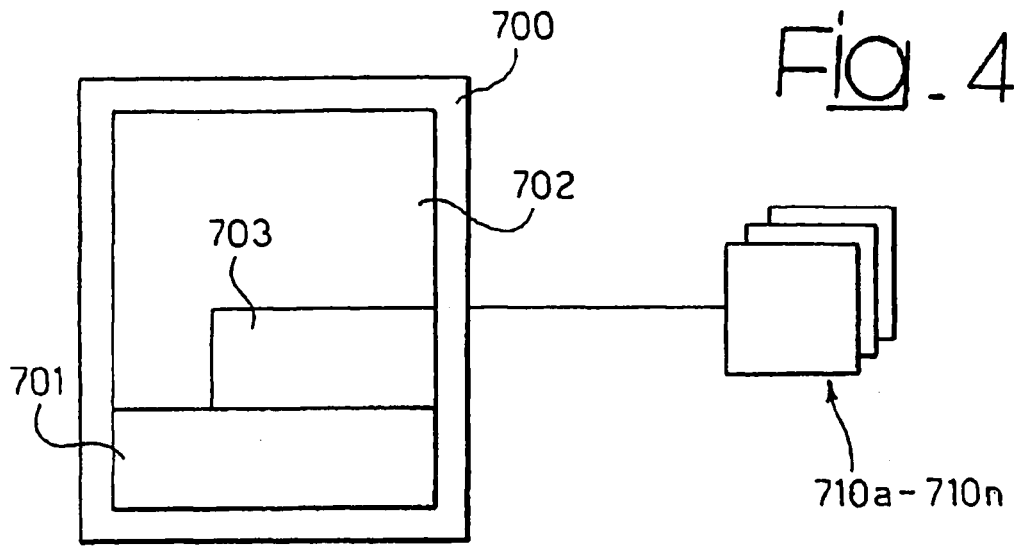
Fig_4
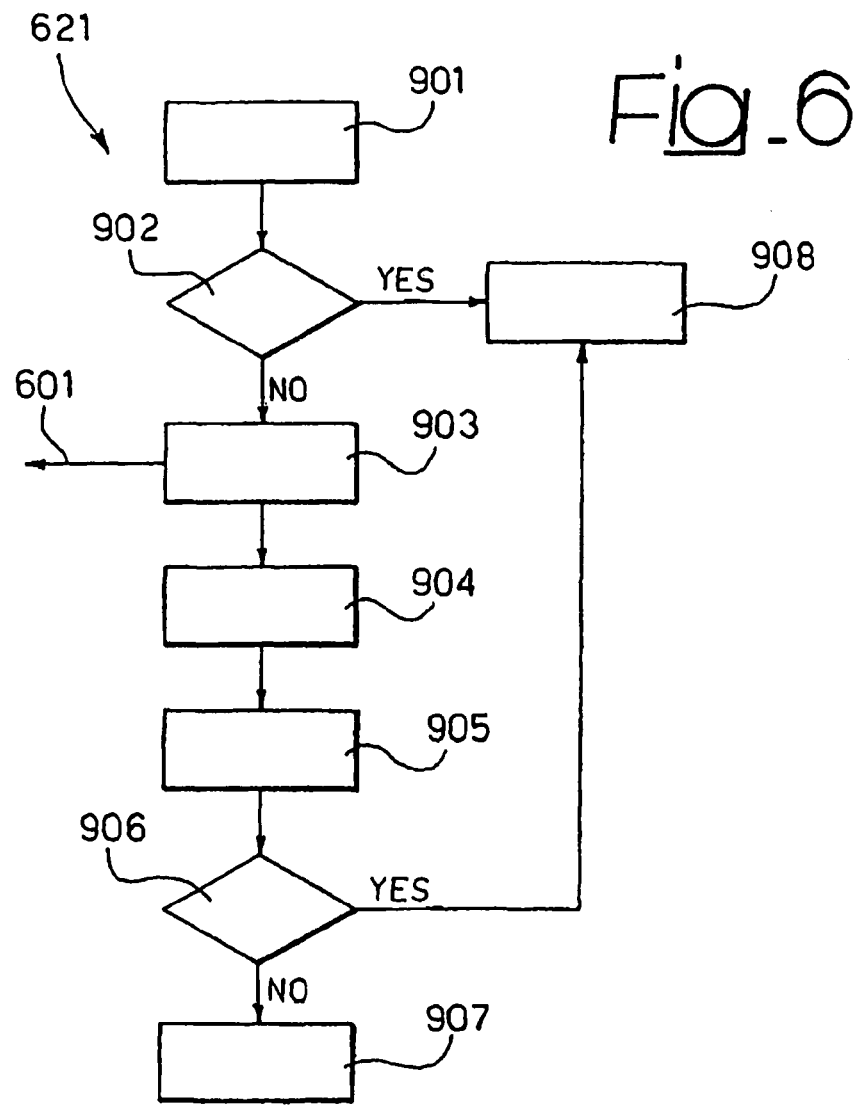
Fig_6

METHOD AND SYSTEM FOR READING DATA, RELATED NETWORK AND COMPUTER PROGRAM PRODUCT THEREFOR

CROSS REFERENCE TO RELATED APPLICATION

This application is a national phase application based on PCT/EP2004/009031, filed Aug. 12, 2004, the content of which is incorporated herein by reference.

FIELD OF THE INVENTION

The present invention generally relates to distributed systems.

The invention was developed by paying specific attention to the possible application to reading data from streaming protocols in client/server systems; reference to this possible application is not however to be construed in a limiting sense of the scope of the invention.

DESCRIPTION OF THE RELATED ART

A computer network generally comprises a collection of machines that communicate following a client/server approach, where clients request services from servers, such as web servers that process data for the clients.

A client program comprises hardware and software to create and send requests to servers and to see the results. A server program is a software application that runs continuously serving the requests from the clients.

Clients and servers communicate over the network using a transport protocol, such as TCP/IP (Transmission Control Protocol/Internet Protocol), which has become the "de facto" standard protocol for transmitting data between distributed applications. The TCP/IP protocol uses the concept of a connection between two sockets for exchanging data between two programs. The server program creates a special "passive" socket that listens for clients that want to establish a connection. The server accepts a pending client connection via the passive socket and creates a new server socket that represents the server end of the newly established connection over which client and server communicate exchanging data.

In order to serve many concurrent clients, server applications are typically "multithreaded". Threads are concurrent execution paths within a single program. For a single threaded server, while the server is busy processing a client request, additional connection requests remain pending in the passive socket backlog queue waiting to be accepted.

This translates in reduced server throughput and long delays experienced by clients, and additionally results in connection refusals to clients when the server socket backlog queue reaches its maximum capacity.

As a consequence, a large majority of server applications are multithread programs. A multithreaded server allows servicing concurrent client requests, where separate threads are used to isolate one client request from the requests of other clients.

Typically, existing server program implementations use a single "master" thread responsible for monitoring the queue that receives incoming connection requests on the passive socket.

Once a pending connection is accepted, the master thread either creates a new "worker" thread or selects an idle thread from a pool of worker threads and assigns the request to the available thread. This allows the worker thread to perform the data processing for the client, while the master thread may continue monitoring and accepting other incoming client connection requests.

Generally, most operating systems and platforms provide I/O socket operations that can be invoked either in a blocking or in a non-blocking mode, both these modes being well known in the art as witnessed e.g. by US-2003/0097488-A1.

In the blocking mode the invocation suspends the thread until the operation can be performed. For example, an "accept" operation will suspend the master thread until a client connection request arrives at the server socket.

Likewise, once a connection is established, a "read" operation will block the worker thread until the client sends the data request to the server.

FIG. 1 shows a typical flow diagram for a multithreaded server with blocking socket operations.

The server environment comprises a master thread 100 and a pool of worker threads 110a-110k.

In an initial step 101 the master thread creates a passive server socket bound to a well known local address. In a step 102 a blocking "accept" operation is issued that suspends the master thread until a pending connection request arrives at the socket. In a step 103 the new connection is accepted, thus the master thread is woken up and the connection is given to one of the worker threads 110i. Then the master thread loops back to step 102 ready to accept the next pending connection, and so forth-until the server is shut down.

Worker threads 110a-110k remain in an idle state, at step 111, until the master thread gives one of them a connection to work on. Upon receiving the client connection from the master thread 100, in a step 112 the worker thread 110i issues a blocking "read" operation that suspends the thread until data is available at the socket or the connection is closed. When the worker thread 110i is woken up from the blocking "read" operation, in a step 113 it checks whether the connection has been closed and if so the thread loops back to step 111 ready to take another client connection from master thread 100.

If the connection has not been closed, in a step 114 the data received at step 112 is interpreted by the parsing process.

For example, the data may represent an HTTP (Hyper Text Transfer Protocol) request if the application is a web server, or the data may contain the marshaled arguments of an RPC (Remote Procedure Call) from the client.

In accordance with the rules of the parsing process of the step 114, in a step 115 the worker thread checks whether all the bytes that constitute a complete client request have been received.

If not enough bytes have been read, the worker thread loops back to the step 112, otherwise it proceeds on to a step 116 where the request is processed and in a step 117 the response is sent back to the client.

For example, the worker thread may read an HTML (Hyper Text Markup Language) file from disk to be sent back to the client that requested it, or it may execute the procedure for an RCP invocation and send back the result to the client.

After having dealt with the client request, the worker thread 110i loops back to step 112 ready to handle additional requests from the same client.

The arrangement described above is indeed capable of processing several concurrent clients but suffers from scalability and performance issues related to the blocking nature of the I/O socket operations. The problem stems from the one-to-one thread/connection relationship that assigns one worker thread to each client connection.

For example, an Instant Messaging (IM) application comprises a number of clients running on personal computers, cellular phones, PDAs (Personal Digital Assistant), or any other suitable terminals. The clients maintain permanent TCP connections to an Instant Messaging server, which provides services for communication and asynchronous presence notification.

In the blocking model for socket operations, the Instant Messaging server needs to allocate one thread for each connected client.

Unfortunately, the number of threads an application can allocate is limited and mediated by the operating system in accordance with the available hardware resources (number of CPUs, main memory size, etc.) and the competing demands of concurrent applications running on the same computer.

Moreover, by allocating too many threads the server may experience a reduced throughput caused by the hefty context-switching overhead among the active threads. Threads are precious computational resources and should be used sparingly.

Hence, a multithreaded server that relies on blocking I/O socket operations can hardly scale to accommodate a large set of concurrent clients due to the limited number of threads allotted to the application.

The non-blocking model for socket operations allows a thread to call several socket operations without blocking and then wait on an event-driven interrupt when any of the non-blocking operations is ready to complete. This model allows one thread to monitor the events on all pending socket operations and then dispatch the operations ready to execute to the worker threads of the pool.

Typically, a "select" operation is used to suspend the thread on the completion of any of the pending non-blocking operations, which comprise the "accept" operations on the passive socket and the "read" operations on all the outstanding client connections.

FIG. 2 shows a typical flow diagram for a multithreaded server with non-blocking socket operations, comprising a master thread 200 and a pool of worker threads 220a-220k.

In an initial step 201 the master thread creates a passive server socket bound to a well known local address, and in a step 202 the socket is configured in non-blocking mode.

In a step 203, a non-blocking "accept" operation is issued and in a step 204 the "select" operation suspends the master thread on the current set of pending non-blocking operations. The first time the "select" operation is performed, only the "accept" operation of a step 203 is comprised in such set.

When any of the pending operations is ready for completion, the master thread is woken up to perform the dispatching process within loop 240.

In one instance of loop 240, in a step 205 the master thread checks whether the ready operation is an "accept" for a pending connection request. If so, in a step 206 the connection is accepted, and in a step 207 the socket representing such connection is configured in non-blocking mode.

In a step 208, a non-blocking "read" operation on the newly established connection is issued and added to the set of pending non-blocking operations, and then loop 240 is repeated.

In another instance, if the check of step 205 is negative, in a step 209 the master thread checks whether the ready operation is a "read" on one of the established client connections.

If so, in a step 210 the master thread gives that connection to one of the worker threads 220a-220k (generally designated as 220i) and loops back to step 204.

In a step 221, the worker thread 220i is notified that the given connection has data available at the socket, and in a step 222 the data is read. At the end of step 222 all data comprising a complete client request has been read, and in a step 223 such data is parsed.

In a step 224 the client request is processed and the response is sent to the client in a step 225.

After this final step the worker thread 220i returns to the idle state 221 ready to process another client request.

Operations of the arrangement shown in FIG. 2 are thus different from the blocking model described in FIG. 1. In the arrangement of FIG. 1, worker thread 110i is bound to the given connection in order to process all the requests from the same client. The thread returns to the pool only after the connection has been closed.

Conversely, worker thread 220i of the arrangement of FIG. 2 returns to the pool soon after processing the given client request, thereby increasing the availability of worker threads and ultimately the scalability of the server application.

Moreover, in loop 140 of FIG. 1, the read operation of step 112 is pipelined to the parsing process, which is thus in control for incrementally "pulling" bytes from the socket as required.

On the other hand, the arrangement of FIG. 2 assumes that all the bytes that constitute a complete client request are read at step 222 before proceeding on to step 223 to parse said request.

The non-blocking nature of the read operation does not allow the parsing process to incrementally "pull" bytes from the socket since the read operation may return zero bytes if none are available, ultimately disrupting the parsing process.

Accordingly, with non-blocking I/O socket operations a need exists for reading all the bytes that constitute a client request prior to beginning the parsing process.

Establishing the boundaries of client requests depends upon the parsing procedure of the application. For example, parsing an HTTP request implies reading a number of bytes separated by special new-line characters that delimit each request header.

Likewise, parsing the data representing an encoded RPC implies a complex parsing process to un-marshal the arguments of the invocation.

The document US-2003/0097488-A1, already cited in the foregoing, makes reference to two approaches for determining the boundaries of client requests in a non-blocking model.

In one approach, a length field (typically 4 bytes) specifying the size of the actual request is pre-pended at the beginning of the data stream. The bytes that constitute the client request then follow thereafter.

In a second approach, the data stream of the client request has one or more terminating characters that mark the end of the request.

Specifically, US-2003/0097488-A1 shows a method for passing to the socket layer the information for determining the boundaries of client requests. This is in the form of a "record definition", which specifies either the length field for the first approach, or the terminating characters for the second approach. The document in question further reveals that implementing such method and technique requires changes to existing operating systems, or to socket interfaces, or both.

Non-blocking socket operations are a great step forward for improving performance and scalability of multithreaded servers but require the application to be able to determine the boundaries of client requests prior to beginning the parsing process.

The parsing process does have the knowledge for establishing the size of the various elements that comprise a request, but Applicant experience has revealed that extracting such knowledge may be difficult in the non-blocking model if said parsing process is enclosed in a separate module that the application uses as is.

For example, the ObjectInputStream class in the Java I/O package allows de-serializing (i.e. parsing) a byte stream into a Java object. Such class may be used by applications that need to implement communication protocols based on serialized Java objects. As known in the art, a typical pattern of usage of the blocking model is to chain the ObjectInputStream to the socket's InputStream. The ObjectInputStream is thus in control for incrementally "pulling" bytes from the socket.

Such pattern of usage cannot be employed in the non-blocking model because the ObjectInputStream always expects some data to be returned when "pulling" bytes from the socket's InputStream.

OBJECT AND SUMMARY OF THE INVENTION

Taking into account the considerations in the foregoing, the specific technical problem exists of providing a multi-threaded server arrangement that:
- exploits non-blocking socket operations to increase scalability and performance;
- does not require tailored operating systems and/or socket interfaces;
- allows patterns of usage in which the parsing procedure incrementally "pulls" bytes from the socket.

The object of the present invention is thus to meet the needs outlined in the foregoing by providing a method for exploiting non-blocking I/O socket operations to improve scalability and performance of server applications, while at the same time offering the simple and intuitive operating available with blocking socket operations.

Moreover object of present invention is to provide a method which does not require changes to the operating systems, nor to socket interfaces.

According to the present invention, such object is achieved by means of a method and system having the features set forth in the claims that follows. The invention also relates to a corresponding system as well as a computer program product loadable in the memory of at least one computer and including software code portions for performing the steps of the method of the invention when the product is run on at least one computer. Reference to "at least one computer" is evidently intended to highlight the possibility for the method of the invention to be carried out in a decentralized manner over a plurality of machines.

A preferred embodiment of the arrangement described herein provides for data being received via a plurality of threads. The data are arranged in client requests subject to a parsing process, which is adapted to identify when all the data constituting a complete client request have been received. A given thread is assigned to handling an incoming client request, while the parsing process is run on the data of the incoming client request received via the assigned thread. That thread is released from assignment to handling the incoming client request when the parsing process indicates that all the data constituting the complete incoming client request has been received.

In brief, the arrangement described herein gives rise to a sort of "fake-blocking" model, which internally exploits non-blocking socket operations but can be used in typical blocking patterns.

In the blocking model, not only does a thread suspend on the read operation while receiving the bytes that constitute one client request ("intra" waits), but also while waiting for receiving several distinct requests from the same client ("inter" waits). Such "intra" waits (within a client request) are generally much shorter than the "inter" waits (between client requests), as the former depends on fragmentation introduced by the transport protocol (few milliseconds) while the latter are determined by users gestures (several seconds or even minutes) and are client dependent.

The arrangement described herein avoids the "inter" waits, which affect performance in the blocking model, while retaining the "intra" waits necessary to support a parsing procedure in control for "pulling" data from the socket.

Based on the arrangement described herein, multithreaded server applications and programs developed in accordance with the blocking model for socket operations can easily be converted into non-blocking socket operations without major tooling of the application design and code.

The arrangement described herein contemplates a variety of methods for processing requests from clients. One specific method is described in further detail, by way of example, using object-oriented methodology that utilizes the Java language in general, and in particular the services and classes of the Java NIO (New I/O) package, which support non-blocking socket operations for the Java platform.

Analogous programming methods in the C programming language directly access the operations of the underlying operating system. Therefore, a preferred embodiment of the arrangement described herein provides a framework of Java classes that realize a synchronization layer on top of the Java NIO package and enables the typical patterns of usage of the blocking model, which programmers and developers are accustomed with.

However, this should not be construed as limiting the applicability of the invention as any programming environment or platform that supports non-blocking I/O socket operations is a possible applicable candidate for the present invention.

BRIEF DESCRIPTION OF THE ANNEXED DRAWINGS

The invention will now be described, by way of example only, with reference to the enclosed figures of drawing, wherein:

FIGS. 1 and 2 have been already described in the foregoing;

FIG. 4 shows a block diagram of an example of a multi-thread server system in a client/server environment;

FIG. 6 shows a flow chart diagram of the internal logic of the "read" operation;

Figure 7:
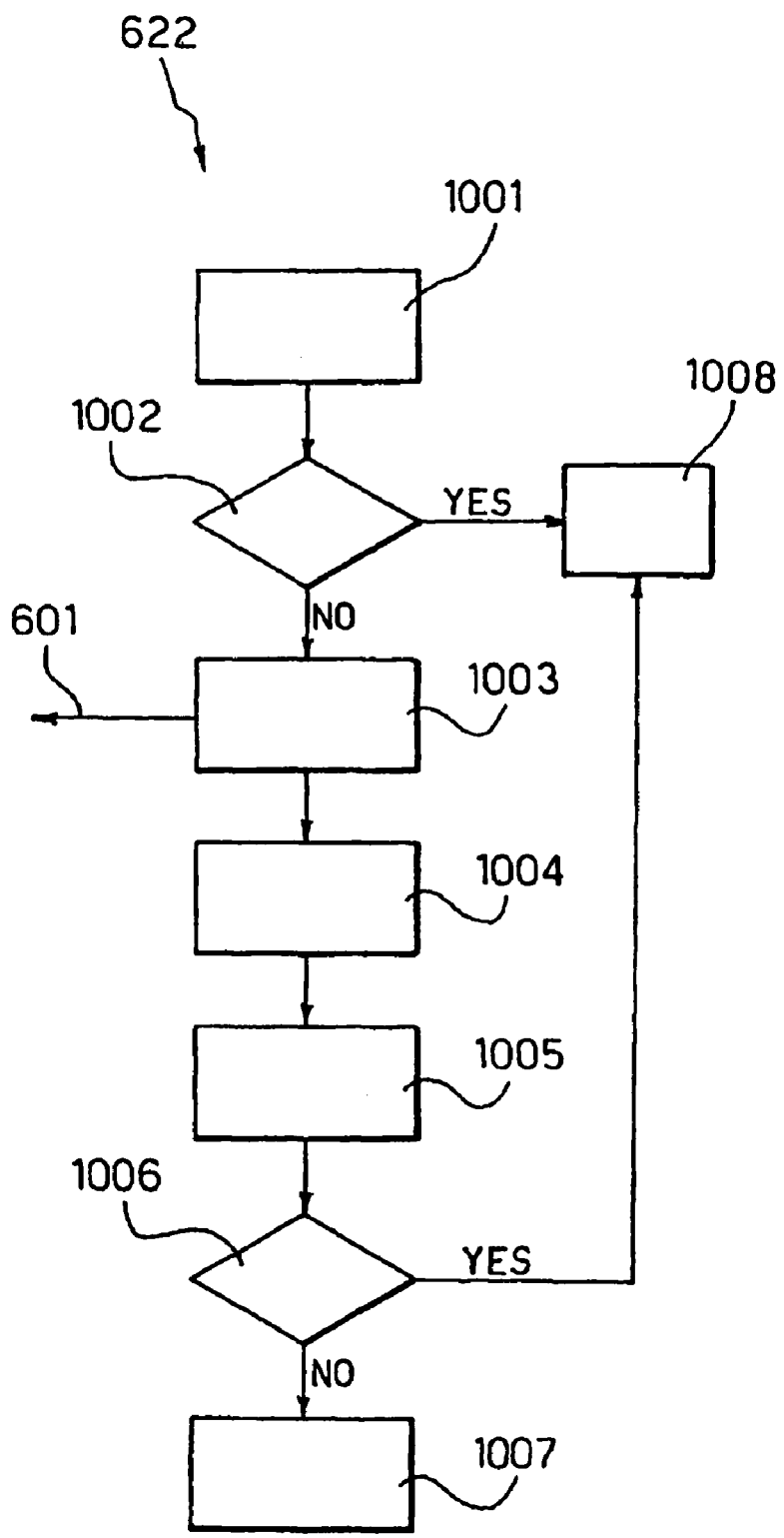

FIG. 7 a flow chart diagram of the internal logic of the "write" operation.

DETAILED DESCRIPTION OF PREFERRED EMBODIMENTS OF THE INVENTION

Figure 1:
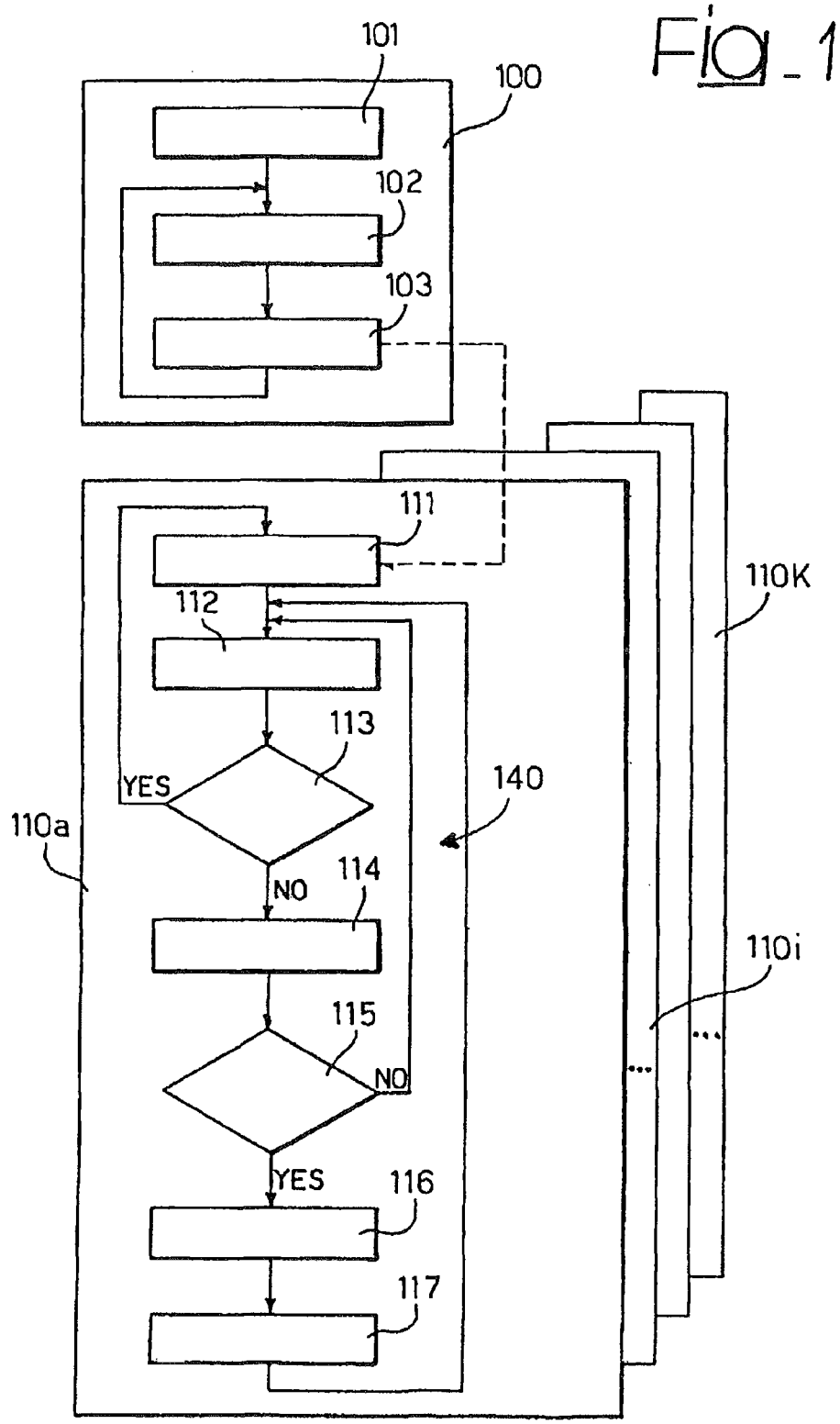
Figure 2:
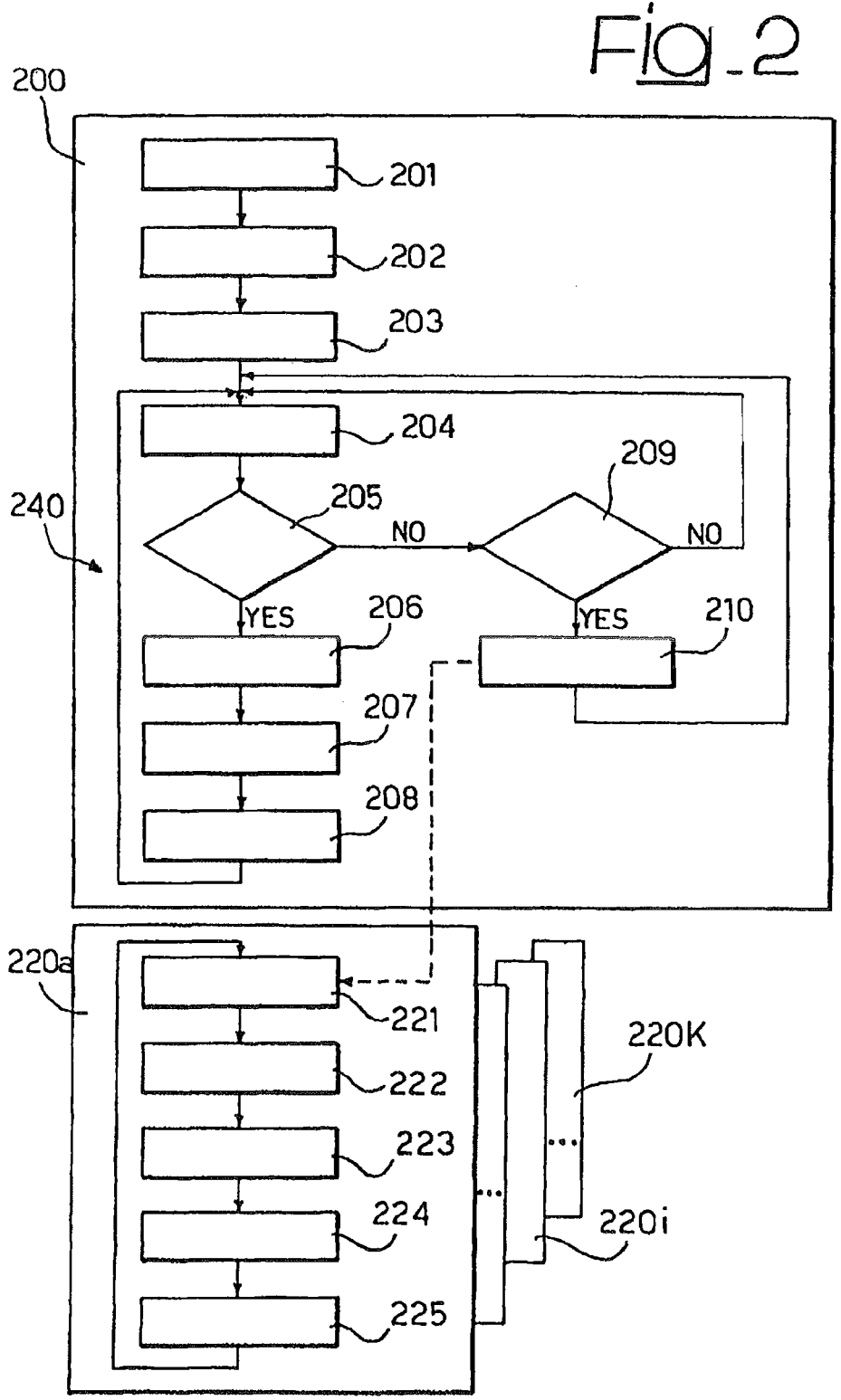
Figure 3:
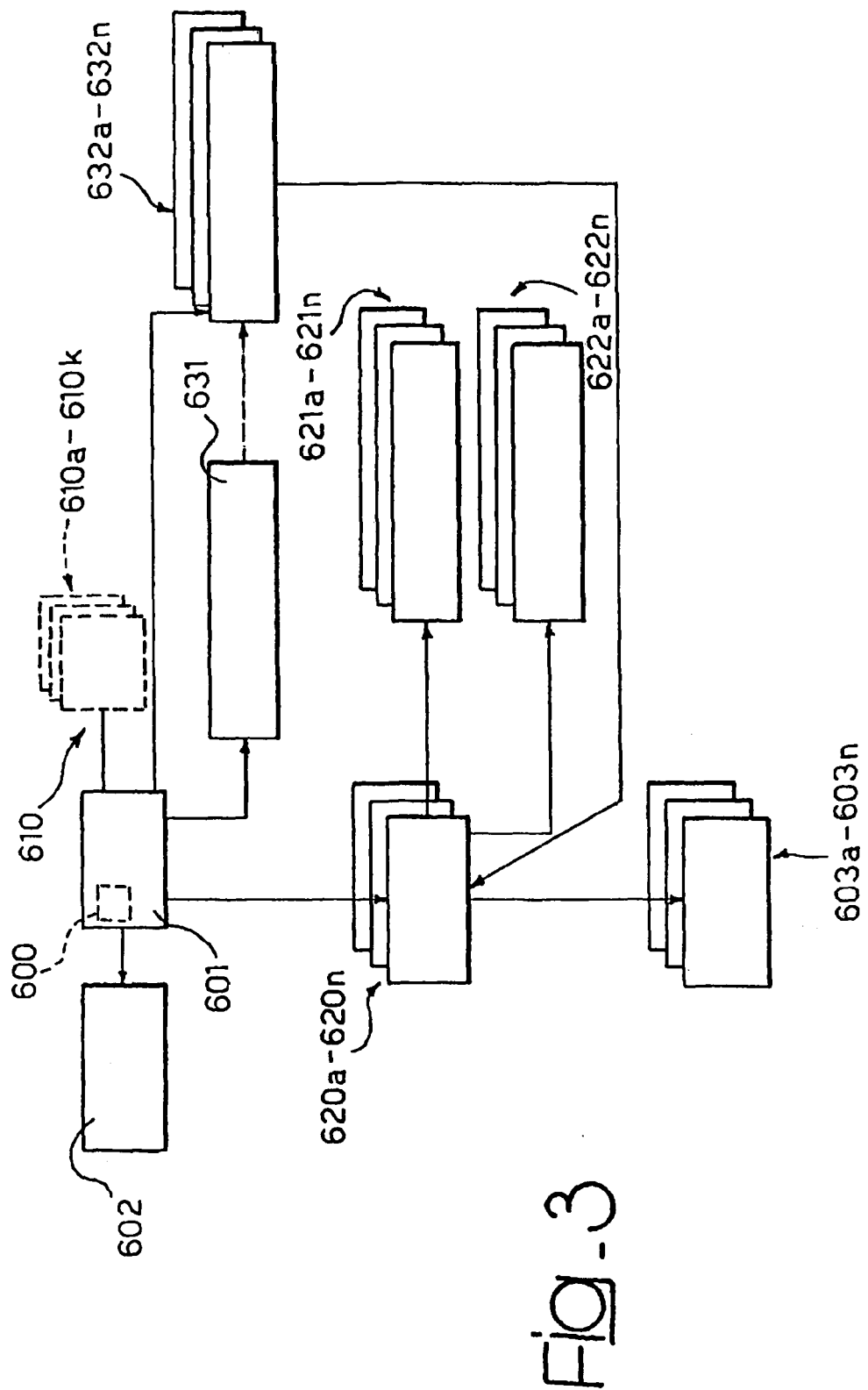
FIG. 3 shows the internal software components of the framework of classes described by the present invention.

FIG. 3 shows the internal components of the framework of the arrangement described herein.

A so-called Reactor component 601 contains a master thread 600 that uses non-blocking I/O socket operations and dispatches events to an application through an InputStreamListener interface 632.

Master thread 600 uses a number of worker threads 610a-610k from a pool 610 to invoke the InputStreamListener interface 632.

The Reactor 601 uses a passive server socket 602 to listen for incoming connection requests, and creates VirtualSockets 620a-620n that encapsulate corresponding client connection sockets 603a-603n.

Each VirtualSocket 620i provides access to a ChannelInputStream 621i and ChannelOutputStream 622i that "extend" (i.e. specialize through inheritance) respectively the InputStream and the OutputStream classes.

The Reactor component 601 uses an InputStreamListenerFactory interface 631 implemented by the application to create concrete implementations 632a-632n of the InputStreamListener interface. Typically there will be one InputStreamListener instance 632i for each VirtualSocket 620i.

FIG. 4 is a block diagram of an example of a multithread server system based on the arrangement described herein.

The embodiment illustrated in FIG. 4 comprises a server 700 that is operable to receive requests from clients 710a-710n in a networked environment.

Clients 710a-710n may be any clients operable to request services from the server 700 such as workstations, wireless devices, or in fact other servers.

The server 700 may be a general or specific purpose computer and includes one or more execution environments 701 that support a programmatic socket layer with non-blocking I/O socket operations.

For example; the server 700 may be a Web server, a Database server, or any type of multithreaded server performing in accordance with the methods described herein.

In a preferred embodiment, the execution environment 701 is a Java Virtual Machine and the socket layer is the Java. NIO package. Each execution environment 701 runs an application 702 that uses the framework classes 703 as described herein to support concurrent clients.

Preferably, the InputStreamListener interface 632 is defined in the Java programming language as follows:

public interface InputStreamListener{public void connectionStarted(VirtualSocket vs);

public void inputAvailable(ChannelInputStream cis); }

By implementing this interface the application is notified when a new client connection has been established and when data is available for reading on the input stream of the given connection.

Figure 5:
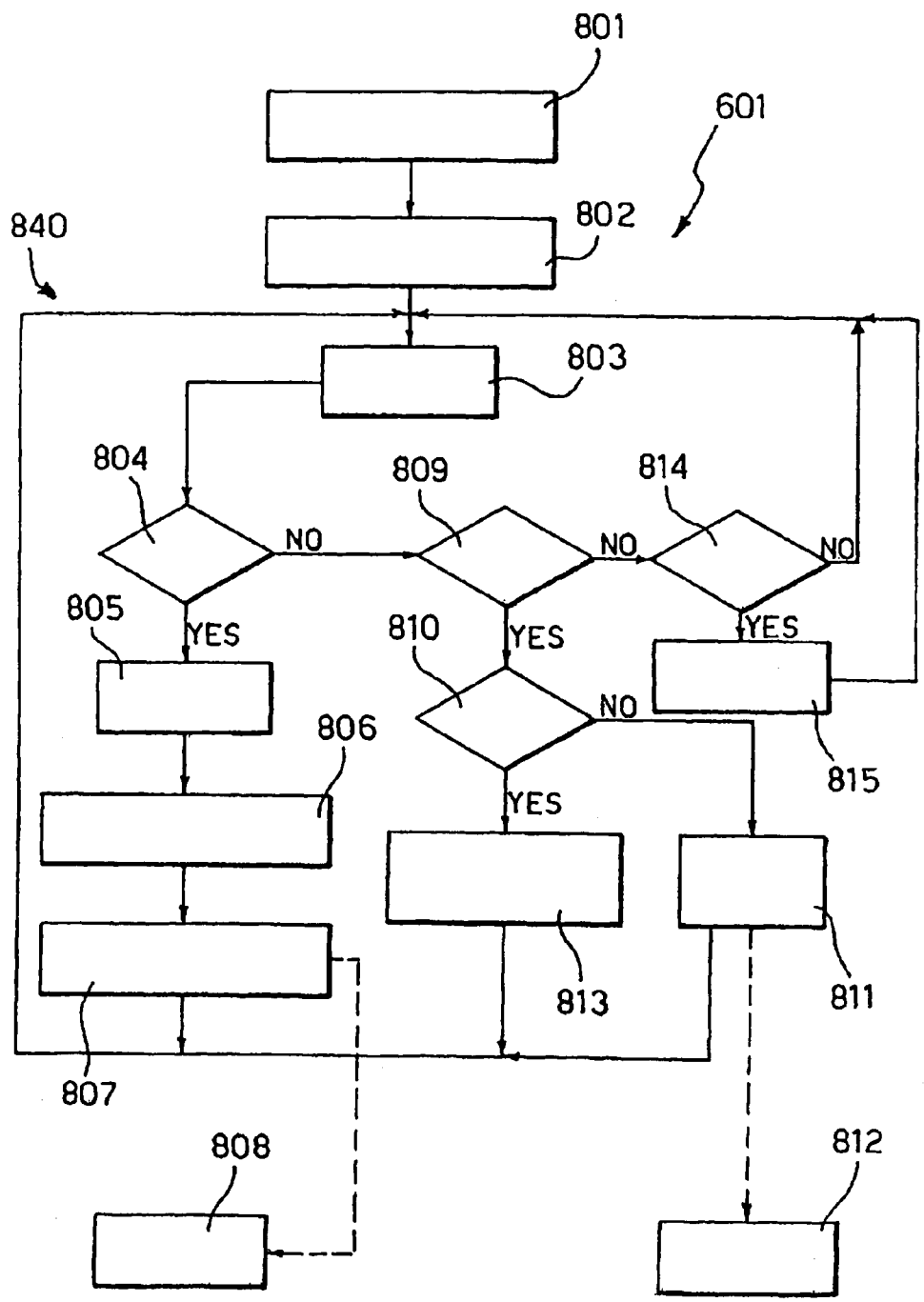
FIG. 5 shows a flow chart diagram of the internal logic of the Reactor component.

FIG. 5 is a flow diagram of the internal logic of the Reactor component 601 carried out by master thread 600 as described herein. In a step 801 a passive server socket 602 is created to listen for incoming connection requests. One possible embodiment utilizes the Selector object of the Java NIO package that supports methods for registering socket operations to be monitored during the "select" procedure.

Registering an operation amounts to expressing the interest in being notified when said operation can be performed without blocking the caller.

Therefore, in a step 802 the "accept" operation for the server socket 602 is registered with the Selector and in a step 803 a main loop 840 is entered.

In a step 803 the "select" operation suspends the master thread 600 on the current set of pending non-blocking operations. The master thread will be woken up by the Selector when at least one pending operation is ready to execute.

In one instance, in a step 804 the master thread 600 checks whether the pending operation that has caused the "select" operation to return is an "accept" operation.

If so, in a step 805 the pending client connection is accepted and in a step 806 a VirtualSocket 620 is created which encapsulates the real socket 603.

The VirtualSocket class provides with a "fake-blocking" model on the otherwise non-blocking socket 603.

In a step 807 master thread 600 elects one worker thread 610i from pool 610 and uses such thread to dispatch VirtualSocket 620 to the application by calling in a step 808 the connectionStarted( ) method on the InputStreamListener interface 632. Finally, master thread 600 loops back to step 803 repeating the "select" cycle.

In another instance, if the test in step 804 yields a negative outcome, i.e. the pending operation that has caused the "select" to return is not an "accept" operation, in a step 809 master thread 600 checks whether the pending operation is a "read" operation for a certain connection.

If so, a step 810 determines if the corresponding VirtualSocket that encapsulates said connection is already being catered for by a worker thread. If no thread is currently working on the connection, in a step 811 one thread 610i is elected from pool 610. This thread is used in a step 812 to notify the application by invoking the inputAvailable( ) method of the InputStreamListener interface 632.

Conversely, if a worker thread 610j is already working on the connection, in a step 813 such thread is signaled that new input data is available. Such signaling is significant since the thread working on the VirtualSocket may be waiting for some input data to complete the parsing procedure. Finally, master thread 600 loops back to step 803 by repeating the "select" cycle.

In yet another instance, if the test in step 809 yields a negative outcome, in a step 814 master thread 600 checks whether the pending operation that has caused the "select" operation to return is a "write" operation for a certain connection.

If so, there must be a worker thread waiting to complete the write operation, and a step 815 is used to signal such thread. Finally, master thread 600 loops back to step 803 by repeating the "select" cycle.

FIG. 6 is a flow diagram of the internal logic of the "read" method of the ChannelInputStream component 621.

The internal logic implemented by the "read" method calls the non-blocking "read" operation on the underlying real socket, and at the same time provides a blocking view to the application that invokes it.

This method will typically be called by the application through the parsing procedure, upon being notified by the Reactor with the invocation of the inputAvailable( ) method of the InputStreamListener interface.

In a step 901 a non-blocking "read" operation is issued to read the data available at the socket. Since the real socket 603 is configured in non-blocking mode, this call returns immediately whether or not data is available.

The first time the method is called some data will certainly be available because the call is issued after the Reactor notifies the application with the inputAvailable event.

In a step 902, the current worker thread checks whether some bytes have been received in the previous step 901 and, if so, these are returned, in a step 908, to the caller, typically being the parsing procedure.

A noteworthy element of the arrangement described herein comes into play when the "read" operation in the step 901 returns no bytes.

Returning zero bytes to the caller would disrupt the parsing procedure with an EOF exception since the caller is expecting a blocking behavior which suspends the thread until data is available.

Therefore, in order to provide this blocking behavior, in a step 903 the current worker thread informs the Reactor 601 that this thread is interested in being signaled when data is available at the socket.

Such interest is registered by adding the "read" operation on this socket 603 to the set of pending I/O operations monitored by the master thread in the "select" at step 803 of FIG. 5.

After expressing its interest in the "read" operation, in a step 904 the current worker thread suspends until either a given timeout expires or the master thread of the Reactor signals the availability of some data, as described in step 813 of FIG. 5.

When woken up, in a step 905 the current thread issues a new non-blocking "read" on the socket, and in a step 906 the thread checks if some bytes have been received. If so, the bytes are returned to the caller of the method. The alternative outcome (no bytes received) means that the timeout has expired and thus a timeout exception is thrown in a step 907.

The combined behavior of the Reactor (executed by the master thread) and the ChannelInputStream (executed by one worker thread) gives rise to the "fake-blocking" model that underlies the arrangement described herein.

Contrary to the blocking model, there are no threads bound to client connections waiting to receive data from the sockets, thus wasting precious thread resources. As opposed thereto, the Reactor dynamically associates a worker thread to a connection only when data is available and notifies the application of such event by invoking the inputAvailable method.

Even though the real socket 603 is configured in non-blocking mode, the read( ) method of the VirtualSocket's ChannelInputStream 621 provides a blocking view to let the parsing process incrementally "pull" data from the socket.

Such blocking view allows the application to use the ChannelInputStream in typical patterns of usage for blocking operations in which a socket's InputStream is expected.

Suspending the worker thread in step 904 within the read( ) method of the ChannelInputStream is quite different from having a dedicated thread suspended on a blocking "read" operation on the underlying socket.

In fact, the former represents an "intra" wait, in which the thread suspends only until all the bytes that constitute a complete client request have been received, while the latter represents an "inter" wait, in which the thread also waits through one client request to the next.

It will be appreciated that the arrangement described herein does not simply switch in a dynamic way the blocking model of the socket operation. For example, when the master thread of the Reactor determines that a ready "read" operation can be carried out, it cannot switch the socket into blocking mode and let a worker thread execute the blocking "read" operation.

In fact, most platforms and environments do not allow dynamically switching from blocking to non-blocking mode. Otherwise, changing the blocking model of the socket during a "read" operation would disrupt a possible concurrent "write" operation and vice versa.

FIG. 7 is a flow diagram of the internal logic of the "write" method of the ChannelOutputStream component 622.

The internal logic implemented by the "write" method calls the non-blocking "write" operation on the underlying real socket 603, and at the same time provides a blocking view to the application that invokes it, and follows the same behavioral pattern of the "read" method of the ChannelInputStream.

In a step 1001 a non-blocking "write" is issued to write the data buffer passed as argument to the method.

Since the socket is configured in non-blocking mode, this call returns immediately whether or not the data buffer has completely been flushed to the socket. In a step 1002 the current worker thread checks whether the number of bytes written corresponds to the buffer size and, if so, in a step 1008 the method returns.

Otherwise, in a step 1003 the current worker thread informs the Reactor 601 that this worker thread is interested in being signaled when data can be written to the socket. Such interest is registered by adding the "write" operation on this socket to the set of pending operations monitored by the master thread in the "select" at step 803 of FIG. 5.

After expressing its interest in the "write" operation, in a step 1004 the current worker thread suspends until either a given timeout expires or the master thread of the Reactor signals the possibility of writing output data as described in the step 815 of FIG. 5.

When woken up, in a step 1005 the current thread issues a new non-blocking "write" on the socket with the remaining data that has not been written in step 1001. In a step 1005, if the data buffer has been flushed completely the method returns, otherwise it means that the timeout has expired and a timeout exception is thrown to the application in a step 1007.

The remainder describes a possible scenario where the arrangement described herein may be exploited in an Instant Messaging (IM) application.

The IM clients are applications running on personal computers, cell phones, PDAs (Personal Digital Assistant), or any other suitable terminals.

Clients may perform several actions, such as exchanging messages, performing buddy searches, and receiving presence change notifications of other users. Presence and messaging services are provided by an IM server application running on a server with UNIX, Windows, or any other operating system that supports threading and non-blocking socket I/O operations.

The communication protocol between the clients and the server may be based on XML (extensible Markup Language), a "de facto" standard language for representing electronic data. XML is a meta-language that defines the structures of well-formed documents and lets applications specify the semantics of the various XML documents.

In the IM application there will be several XML message formats corresponding to the various user gestures and actions. For example, one XML message format is used to represent an instant message from a user to another user. Another XML message format describes the match criteria for performing a buddy search. Yet another XML message format represents a presence notification that a user receives when one of his/her buddies changes their presence status by logging in/out the system.

Based on the arrangement described herein, the IM server application can guarantee scalability and performance without sacrificing ease of development and flexibility.

---

The foregoing may be implemented based on the Java pseudo-code reported hereinbelow.

```
1.  public class Acceptor implements
    InputStreamListenerFactory {
         private DocumentListenerFactory dlf;
2.    public Acceptor(int port) {
3.         ServerSocketChannel ssc =
    ServerSocketChannel.open( );
4.         ssc.socket( ).bind(new
    InetSocketAddress(port) );
5.         Reactor r = new Reactor(32);
6.         r.registerServerChannel(ssc, this);
7.         new Thread(r).start( );
         }
8.    public InputStreamListener create( ) {
9.         return new Connector( );
         }
    }
10. public class Connector implements
    InputStreamListener {
         private DocumentListener docListener;
```

-continued

The foregoing may be implemented based on the Java pseudo-code reported hereinbelow.

```
        private DocmentBuilder builder;
11.   public Connector( ) { }
12.   public void connectionStarted(VirtualSocket
vs) {
13.         builder =
documentBuilderFactory.newDocumentBuilder( );
14.         docListener =
IMServer.getDocumentListenerFor(vs);
      }
15.   public void inputAvailable (ChannelInputStream
cis) {
17.         Document doc = builder.parse(cis);
18.         docListener.receiveDocument(doc);
      }
19.   public void sendDocument(Document doc) {
            doc.serialize(cos);
      }
    }
30. public interface DocumentListener {
31.   public void receiveDocument (Document doc);
    }
40. public class IMServer {
41.   public static void main(String[ ] args) {
42.         Acceptor acceptor = new Acceptor(this,
"1234");
      }
```

In detail, in a Java embodiment, the communication layer of the IM server comprises an Acceptor class (1) and a Connector class (10), while the main class of the application is the IMServer class (40). Upon entering the main method of the IMServer class (41), an instance of the Acceptor is created (42) to listen for incoming client connections on port "1234".

As the Acceptor constructor is executed (2), a ServerSocketChannel is created (3) and bound to the given port (4). Then a Reactor object is also created specifying a pool of 32 threads (5). This number of threads is arbitrarily chosen in this example, while it will typically be determined by taking into account the specific hardware and software constraints. The ServerSocketChannel is registered with the Reactor passing also the Acceptor instance ("this" parameter) as InputStreamListenerFactory object (6). Having the Acceptor to implement the InputStreamListenerFactory interface avoids defining a separate class for that purpose, though a different implementation may certainly choose otherwise.

By implementing the InputStreamListenerFactory the "create" method (8) of the Acceptor will be invoked by the Reactor to obtain concrete instances of the InputStreamListener interface. Finally, a master thread is created (7) to carry out the selection process within the Reactor.

When a new client connection is established, the Reactor calls the "create" method (8) of the InputStreamListenerFactory implemented by the Acceptor. The "create" method implementation returns a new instance of the Connector class (9), which implements the InputStreamListener interface. Having the Connector to implement the InputStreamListener interface avoids defining a separate class for that purpose, though a different implementation is certainly possible.

When the Connector is returned by the "create" method, the Reactor calls its connectionStarted( ) method (12) passing in the VirtualSocket object that encapsulates the established connection. The Connector exploits this invocation to create the XML DOM (Document Object Model) builder (13) and to retrieve the DocumentListener object (14) that will receive and interpret the XML messages from the client. When data is available at the socket the Reactor calls the inputAvailable( ) method (15) of the Connector whose logic is to parse the input stream and build the DOM object for the XML document (17). The DocumentBuilder class is part of the Java XML package and its "parse" method takes as argument an InputStream instance (or derived sub-class), thus accepting the ChannelInputStream which indeed extends the InputStream class. The DOM object is then passed to another class (18) of the application (not represented herein) that implements the DocumentListener interface (30) and whose responsibility is to interpret the received DOM object and dispatch to the appropriate logic. For example, a DOM object that represents a buddy search request will be dispatched to the search engine on the user database, whereas a DOM object representing an instant message will be relayed to the appropriate target user, and so forth.

The logic to send a DOM object to the client (19) is even simpler since it only needs to serialize the DOM object into an encoded XML character stream chained to the VirtualSocket's ChannleOutputStream.

Of course, without prejudice to the basic principles of the invention, the details and embodiments may vary, also significantly, with respect to what has been described herein by way of example only, without departing from the scope of the invention as defined by the claims that follow.

The invention claimed is:

1. A method of receiving data via a plurality of threads, said data being arranged in client requests subject to a parsing process, wherein at least one of said client requests is susceptible to being received in a plurality of fragments, wherein said parsing process is adapted to identify when a complete client request has been received, the method comprising:
    assigning a given thread to handling an incoming client request, said incoming client request comprising a plurality of fragments;
    starting to run said parsing process at the receipt of a first fragment of said incoming client request received via said assigned given thread;
    checking via said given thread assigned to handling an incoming client request whether any data of said incoming client request have been received;
    when no such data have been received over a given time interval releasing said given thread from assignment to handling said receiving client request; and
    waiting to release said given thread from assignment to handling said incoming client request until at least said parsing process indicates that a last fragment of said incoming client request has been received.

2. The method of claim 1, comprising:
    listening for incoming client requests;
    creating virtual sockets that encapsulate corresponding client connection sockets, wherein said virtual sockets provide access to an input stream and an output stream used by said parsing process; and
    detecting when a new client connection has been established over said given thread and when data are available for reading on the input stream of said given connection.

3. The method of claim 1, comprising signaling the availability of new input data to said given thread assigned to handling an incoming client request.

4. The method of claim 1, comprising issuing an information item indicative of said given thread assigned to handling an incoming client request requesting to be signaled when further data of said incoming client request are available.

5. The method of claim 1, comprising discontinuing operation of said given thread assigned to handling an incoming client request until either a given timeout expires or when further data of said incoming client request are available.

6. The method of claim 1, comprising dynamically assigning any of said threads in said plurality to handling a given incoming client request only when data of said incoming client request are available.

7. The method of claim 1, comprising:
associating with said given thread assigned to handling an incoming client request a data buffer containing a set of data to be written into a corresponding socket;
performing a first writing operation of at least a part of said data into said socket;
letting said given thread check whether said set of data has been completely written into said socket in said first writing operation;
if said set of data has not been completely written into said socket, issuing an information item indicative of said given thread requesting to be signalled when further data can be written into said socket; and
performing, when said thread is signalled or a given timeout has expired, at least one second writing operation to write into said socket at least one further portion of said set of data.

8. The method of claim 1, wherein said data are configured to convey an instant messaging service.

9. A non-transitory computer readable medium comprising software code capable of performing the steps of the method of claim 1.

10. A non-transitory computer readable medium for receiving data, said data being arranged in client requests, wherein at least one of said client requests is susceptible to being received in a plurality of segments, comprising:
a plurality of worker threads for receiving said data;
a master thread configured for assigning a given worker thread of said plurality to handling an incoming client request, said incoming client request comprising a plurality of fragments;
a parser module configured for starting to run a parsing process on the data of said incoming client request received via said assigned given worker thread at the receipt of a first fragment of said incoming client request, and identifying when a last fragment of said incoming client request has been received; and
said worker threads configured for checking whether any data of said incoming client request have been received over a given time interval, and, when no such data have been received over a given time interval, releasing said given thread from assignment to handling said receiving client request;
wherein said master thread is configured for waiting to release said given worker thread from assignment to handling said incoming client request until at least said parser module indicates that the last fragment of said incoming client request has been received.

11. The non-transitory computer readable medium of claim 10, comprising:
a passive socket for listening for incoming connection requests and creating virtual sockets encapsulating corresponding client connection sockets,
said parser module supported by an input stream and an output stream, wherein said virtual socket provides access to said input stream and said output stream.

12. The non-transitory computer readable medium of claim 10, comprising master thread configured for signaling the availability of new input data to said given worker thread assigned to handling an incoming client request.

13. The non-transitory computer readable medium of claim 10, comprising given worker threads configured for issuing an information item requesting the worker thread to be signaled when further data of said incoming client request are available.

14. The non-transitory computer readable medium of claim 10, comprising worker threads configured for discontinuing the operation of handling an incoming client request until either a given timeout expires or when further data of said incoming client request are available.

15. The non-transitory computer readable medium of claim 10, comprising master thread configured for dynamically assigning any of said worker threads in said plurality to handling a given incoming client request only when data of said incoming client request are available.

16. The non-transitory computer readable medium of claim 10, comprising:
a module configured for associating with said given thread assigned to handling an incoming client request a data buffer containing a set of data to be written into a corresponding socket;
a module configured for performing a first writing operation for at least a part of said data into said socket;
a module configured for letting said given thread check whether said set of data has been completely written into said socket in said first writing operation, and
if said set of data has not been completely written into said socket, a module configured for issuing an information item indicative of said given thread requesting to be signalled when further data can be written into said socket; and
a module configured for performing, when said thread is signalled or a given timeout has expired, at least one second writing operation to write into said socket at least one further portion of said set of data.

17. The non-transitory computer readable medium of claim 10, wherein said data are configured to convey an instant messaging service.

18. A communication network, wherein data arranged in client requests are received via a plurality of threads, comprising a non-transitory computer readable medium according to claim 10.

* * * * *